United States Patent
Huang et al.

(10) Patent No.: US 12,281,237 B2
(45) Date of Patent: Apr. 22, 2025

(54) AUTOMOTIVE GRAPHENE SURFACE TREATMENT COMPOSITION AND PROCESS FOR USE THEREOF

(71) Applicant: Illinois Tool Works Inc., Glenview, IL (US)

(72) Inventors: Tsao-Chin Clarence Huang, Glenview, IL (US); John Isidoro Escoto, Jr., Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 324 days.

(21) Appl. No.: 17/854,608

(22) Filed: Jun. 30, 2022

(65) Prior Publication Data

US 2023/0008182 A1    Jan. 12, 2023

Related U.S. Application Data

(60) Provisional application No. 63/217,345, filed on Jul. 1, 2021.

(51) Int. Cl.
| | | |
|---|---|---|
| *C09D 183/04* | (2006.01) | |
| *C09D 5/02* | (2006.01) | |
| *C09D 7/61* | (2018.01) | |

(52) U.S. Cl.
CPC ............ *C09D 183/04* (2013.01); *C09D 5/021* (2013.01); *C09D 5/022* (2013.01); *C09D 5/028* (2013.01); *C09D 7/61* (2018.01)

(58) Field of Classification Search
CPC ....... C09D 183/00–183/16; C09G 1/04; C08K 3/042
See application file for complete search history.

(56) References Cited

U.S. PATENT DOCUMENTS

| | | | | |
|---|---|---|---|---|
| 6,395,790 | B1 * | 5/2002 | Creutz | ........................ C08J 3/03 524/588 |
| 2004/0171744 | A1 | 9/2004 | Huang et al. | |
| 2007/0275867 | A1 * | 11/2007 | Serobian | .................. C09G 1/16 510/466 |
| 2012/0252923 | A1 * | 10/2012 | Serobian | .............. C09D 5/1637 523/102 |
| 2021/0189130 | A1 | 6/2021 | Phang et al. | |

FOREIGN PATENT DOCUMENTS

| | | |
|---|---|---|
| CN | 109135533 A | 1/2019 |
| CN | 111040625 A | 4/2020 |
| EP | 0739962 A2 | 10/1996 |
| EP | 1054032 A2 | 11/2000 |
| WO | 2012135187 A1 | 10/2012 |

OTHER PUBLICATIONS

Machine translation of CN109135533. Retrieved Sep. 26, 2024.*
Chouhan et al. "Surface chemistry of graphene and graphene oxide: A versatile route for their dispersion and tribological applications", Advances in Colloid and Interface Science, 283, (2020); pp. 102215-1 to 102215-28.*
Int'l Search Report for PCT/US2022/035730, dated Oct. 19, 2022.

* cited by examiner

*Primary Examiner* — Prashant J Khatri
(74) *Attorney, Agent, or Firm* — MaxGoLaw PLLC

(57) ABSTRACT

A composition is provided that includes a graphene dispersion, a silicone microemulsion, a reactive siloxane emulsion, and water as a majority by weight of the composition. A process for imparting a durable shine to a vehicle surface is also provided. The composition is applied to the vehicle surface. The water is allowed to evaporate from the composition to form a coating imparting a durable shine to the vehicle surface. A coating is obtained after evaporation. The coating includes a silicone film formed by the evaporation of water from a silicone microemulsion and the cross-linking of a siloxane from an emulsion. Graphene particles are embedded in the silicone film. The coating has a thickness of between having a thickness of between 5 and 10,000 nanometers and a hardness of between 3 and 7 GPa.

14 Claims, No Drawings

AUTOMOTIVE GRAPHENE SURFACE TREATMENT COMPOSITION AND PROCESS FOR USE THEREOF

RELATED APPLICATIONS

This application claims priority benefit of U.S. Provisional Application Ser. No. 63/217,345; filed Jul. 1, 2021; the contents of which are hereby incorporated by reference.

FIELD OF THE INVENTION

The present invention in general relates to a cleaning composition for various substrates and to a substrate coated with such composition, and in particular, to an aqueous composition for cleaning vehicle surfaces and also providing a durable protective surface coating that imparts water repellency and weathering protection properties to the underlying surface.

BACKGROUND OF THE INVENTION

Vehicles have a tendency to accumulate a variety of surface contaminants such as grime, brake dust, insect splatter, tar, tree sap, sticker adhesive and bird droppings. The severity of this tendency depends on the type of vehicle, season, driving habits, weather, traffic conditions, among various other factors. If the contaminants have sufficient residence time on the vehicle surface, subsequent removal becomes difficult and eventually leads to surface damage such as pitting. A common feature of these surface contaminants is that they tend to be lipophilic and as a result, are not easy removed with soap or even detergents absent mechanical forces. The removal of such stains with manual rubbing is both time consuming and can lead to underlying surface marring. Removal is further complicated when the vehicle surface is angled so that sprayed cleaning compositions run off or the target stain is not readily accessible such as when on a vehicle roof, fascia, or mud flap.

The current surface treatment and organic solvent-based products are time consuming to use from a professional standpoint and for a consumer represents another product that must be purchased and stored to properly clean a vehicle. While products capable of combining the functions of an aqueous detergent with that of a lipophilic stain remover have been made, as detailed for example in U.S. Pat. No. 5,660,641 such products have met with limited success as the applied solutions tend to run off vehicle surfaces too quickly to properly wet and lift a lipophilic stain thereby leaving a user to yet again resort to manual force to scrub the lipophilic stain from the vehicle surface. Any residual coating while imparting shine and UV protection tends to be readily debrided from the surface.

Various non-caustic and environmentally safe components of cleaning agents have been demonstrated to be capable of removing greasy and oily soils from a variety of surfaces to be cleaned. For example, a non-caustic cleaner is described in U.S. Pat. No. 4,511,488 which comprises d-limonene. The cleaning compositions is effective for industrial cleaning tasks, such as those in machine shops, automotive service centers, food processing industries, where oily and particulate soils accumulate.

Thus, there exists a need for an aqueous vehicle surface cleaning composition that can lift stains while providing a durable surface protective coating for both porous and semiporous automotive hard surfaces. There further exists a need for an aqueous vehicle surface cleaning composition capable of lifting lipophilic stains. There further exists a need for an aqueous vehicle surface cleaning composition that is operative as a prewash or standalone stain remover that can be sprayed-on and wiped-off after the stain has been lifted from the underlying vehicle surface.

SUMMARY OF THE INVENTION

A composition is provided that includes a graphene dispersion, a silicone microemulsion, a reactive siloxane emulsion, and water as a majority by weight of the composition. A process for imparting a durable shine to a vehicle surface is also provided. The composition is applied to the vehicle surface. The water is allowed to evaporate from the composition to form a coating imparting a durable shine to the vehicle surface.

A coating is obtained after evaporation. The coating includes a silicone film formed by the evaporation of water from a silicone microemulsion and the cross-linking of a siloxane from an emulsion. Graphene particles are embedded in the silicone film. The coating has a thickness of between 5 and 10,000 nanometers, and a hardness of between 3 to 7 GPa.

DETAILED DESCRIPTION OF THE INVENTION

The present invention has utility as a vehicle exterior and interior hard surface treatment composition. An inventive composition includes at least one graphene dispersion for treating both porous and semiporous automotive hard surfaces. Graphene in the composition is operative as a mild mechanical abrasive to surface debris from the surface faces and imparts hardness to the resulting residual shiny coating. A multi-surface treatment is present to form a film on the surface and/or to impart the hard surface cleaning performance. One or more polysiloxane components are used in an inventive composition for detailing a vehicle to clean and polish the vehicle surface and to impart a grainless finish of high luster after buffing. One or more gloss enhancers are present to provide a gloss to the finish.

Numerical ranges cited herein are intended to recite not only the end values of such ranges but the individual values encompassed within the range and varying in single units of the last significant figure. By way of example, a range of from 0.1 to 1.0 in arbitrary units according to the present invention also encompasses 0.2, 0.3, 0.4, 0.5, 0.6, 0.7, 0.8, and 0.9; each independently as lower and upper bounding values for the range.

The following description of various embodiments of the invention is not intended to limit the invention to these specific embodiments, but rather to enable any person skilled in the art to make and use this invention through exemplary aspects thereof.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also, as used herein, "and/or" refers to and encompasses any and all possible combinations of one or more of the associated listed items, as well as the lack of combinations when interpreted in the alternative ("or").

As used herein, graphene is defined as a two-dimensional material constructed by close-packed carbon atoms including a single-layer graphene, double-layer graphene, few-layer graphene, and graphene nanoplatelets.

As used herein double-layer graphene is defined as a stack graphene of two layers, few-layer graphene is defined as a stack of graphene of 3-10 layers, graphene nanoplatelet is defined as a stack of graphene of more than 10 layers. The graphene materials can be made by chemical or mechanical exfoliation of graphite, chemical vapor deposition, physical vapor deposition, microwave plasma, sonication/cavitation in solvent, organic synthesis, and epitaxy growth on a substrate.

As used herein, graphene oxide is defined as graphene with various oxygen-containing functionalities such as epoxide, carbonyl, carboxyl, and hydroxyl groups and a total oxygen content of 10-60 weight percent, typically around 20-50 weight percent.

As used herein, reduced graphene oxide is defined as graphene oxide that has been chemically or thermally reduced with a total oxygen content of typically in the range of 10-50 percent depending on the extent of the reduction.

As used herein, a nanoplatelet is defined as having planar dimensional in orthogonal direction of each independently between 2 and 20 nanometers.

Embodiments of the hard surface treatment composition form a protective barrier on porous and semiporous surfaces and that protective barrier imparts water repellency and weathering protection properties to the finish. The water repellency or hydrophobicity means water will be repelled instantaneously, i.e., water will bead up and roll off the surface along with most dust, grime, or mud because they are prevented from forming a bond to the vehicle hard surface, as opposed to accumulating on the surface and any remaining dust on the vehicle surface can be removed with less effort. Snow and ice do not stick to the treated surface and mud just slides off. In specific inventive embodiments, additional components may be added to the composition if needed such as preservative system, fragrance, UV stabilizer, antifoaming agent, or an antioxidant.

Vehicles surfaces amenable to cleaning by an inventive composition and protection by a residual high shine film coating formed therefrom illustratively includes tires, exterior vehicle trim, interior vehicle trim, dashboard surfaces, and door trim.

Different application methods for embodiments of the hard surface treatment composition. illustratively include using aerosol spray, liquid spray, or wipes to deliver the hard surface treatment composition to the automotive and other hard surfaces.

Not to be limited to a particular theory, in inventive embodiments of the hard surface treatment the graphene dispersed in an aqueous solution typically present from 0.5 to 20 weight percent of the aqueous dispersion. The graphene interacts with other substances such as dust particles and can attach themselves to the dust particles to facilitate the cleaning process and also to keep the treated surface clean and easier to clean. The low surface energy of graphene also complements silicones in the film coating to inhibit dirt and debris adhesion and hardens the resulting film coating against abrasion thereby significantly improving the surface cleaning composition. When the surface cleaning formulations are enhanced by these aqueous dispersions of graphene, the treated surfaces receive the aforementioned enhanced anti-dust properties and at the same time glass surfaces are less likely to exhibit fogging. Therefore, these aqueous dispersions of graphene can be used to adjust the hydrophobic or hydrophilic properties of the treated surfaces. As a result, treated surfaces shed dust naturally, look cleaner/fresher, and require less manual maintenance.

Graphene is layered $sp^2$ hybridized carbon atoms in a honeycomb-like, 2-dimensional sheet. Graphene is known to have excellent mechanical strength and flexibility, thermal and electric conductivities, and much higher optical cross section relative to many polymer coatings. Graphene as used in the present invention have a maximal linear extent in the three orthogonal X-Y-Z directions of between 3 and 50 nm, and secondary linear extent to at least 20 percent of the maximal linear extent. In addition, the graphene has an aspect ratio between about 25 and 25,000 between the maximum linear extent and the minimum linear extent, synonymously referred to herein as thickness. Ultra-thin graphite with average thickness is between 20 to 100 nm is also considered as a graphene-type material which can give similar performance enhancement like graphene in many real-world applications. Typical loading of graphene in an inventive composition range from 0.001 to 1 total weight percent.

Graphene-type materials operative in the present invention include single-layer graphene, double-layer graphene, few-layer graphene, graphene oxide (GO), reduced graphene oxide (rGO), exfoliated graphene nanoplatelets, and ultra-thin graphite because all of these materials can enhance properties of compositions to which they are added.

In inventive embodiments of the hard surface treatment composition, the graphene can be single layer graphene, few-layer graphene, or multi-layer graphene nanoplatelet, or a combination thereof. Graphene nanoplatelet is low cost and has an easy-handling nature as compared to single layer graphene. The thickness and size of graphene or graphene nanoplatelets can be adjusted to meet the processing requirements, coating quality, and coating performance needs. In addition to graphene or graphene nanoplatelet, other additives may be added in the formulation to provide different properties and functionalities. Such additives include but are not limited to graphite, carbon black, carbon fibers, carbon nanotubes, metallic or ceramic flakes or particles.

A silicone emulsion operative herein is readily formed according to conventional techniques and is commercially available. Suitable silicone emulsions operative herein are detailed in for example U.S. Pat. Nos. 4,221,688; 4,504,549; and 4,535,109. A typical silicone emulsion per the present invention has a weight average molecular weight of between 100,000 and 2,000,000. In some inventive embodiments, the silicone is elastomeric. The emulsion is between 2 and 40 percent by weight silicone with stabilizing surfactant and a majority phase of water. Upon drying, a hydrophobic film results that is hardened according to the present invention by the inclusion of the colloidal dispersion or water glass.

Typically, the silicone microemulsion is present from 3 to 23 total percent. Water contained within emulsions as a carrier or other components is not counted toward total amounts of water in the following tables or the appended claims.

An inventive composition also includes a reactive siloxane oil-in-water (O/W) emulsion of 0.5% to 20% by weight of a cationic emulsifier as the main emulsifier in the emulsion, up to 75% by weight of a siloxane in dispersed phase with average particle size of 0.2 to 5 microns, and water. The siloxane is liquid at 25° C. and has units according to formula (I):

$$R^1{}_n SiO_{4-m/2} \tag{I}$$

where $R^1$ is $C_1$-$C_6$ alkyl, or $C_0$-$C_6$ alkyl hydroxyl groups and n has a value of from 0 to 3 and the cationic emulsifier lacks a halogen containing counter ion.

Other siloxanes operative in the reactive siloxane oil-in-water emulsion include linear siloxanes of the general formula (II):

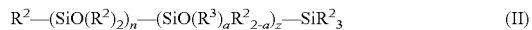

$$R^2-(SiO(R^2)_2)_n-(SiO(R^3)_aR^2_{2-a})_z-SiR^2_3 \quad (II)$$

where $R^2$ is $C_1$-$C_{20}$ alkyl, $C_2$-$C_{18}$ alkyl, or $C_6$-$C_{20}$ alkyl, and $R^3$ is a siloxane side chain (III):

$$-O-(SiO(R^2)_2)_nSiR^2_3 \quad (III)$$

where n is an integer with a value of from 0 to 100,000; a is an integer with a value of from 0 to 2, inclusive; and z is an integer with a value of from 0 to 100, inclusive.

The reactive siloxane emulsions have a dynamic viscosity of from 1 to 1,000,000 mPa·s at 25° C. Exemplary reactive siloxanes include polydihydrocarbyl siloxane; polydimethyl siloxanes; polydimethyl polymethyl phenyl siloxanes such as cyclic polydimethyl siloxanes; linear siloxanes such as α, ω silanol end-blocked polydimethyl siloxane, α,ω trimethyl silyl end-blocked polydimethyl siloxane, dimethyl siloxane methyl phenyl siloxane copolymers, dimethyl siloxane methyl alkyl ($C_{12-18}$) siloxane copolymers; branched siloxane polymers; and vinyldimethyl silyl end-blocked polydimethyl siloxanes; or combinations thereof. Cyclic polydimethyl siloxanes operative herein include octamethyl cyclotetrasiloxane and decamethyl cyclopentasiloxane.

Emulsification of the reactive siloxane occurs using the cationic surfactant. Examples of suitable cationic surfactants include fatty acid methylammonium methosulphate, fatty acid methylammonium ethosulphate, fatty acid methylammonium acetate.

Typically, the reactive siloxane oil-in-water (O/W) emulsion is present from 1 to 17 total percent. Water contained within emulsions as a carrier or other components is not counted toward total amounts of water in the following tables or the appended claims.

Optional additives in an inventive composition illustratively include a pH modifier, a defoaming agent, a fragrance, a UV stabilizer, or an antioxidant, or combinations thereof. In some embodiments, a pH modifier is present in an amount to achieve a composition pH of between 5 and 11. pH modifiers operative herein illustratively include amino-2-hydroxyethane, 2-[bis(2-hydroxyethyl)amino]ethanol, 2-amino-2-methyl-1-propanol, soda ash, sodium hydroxide, and lime.

A defoaming agent is present in certain embodiments in an amount present to inhibit foaming during application to a target surface. Defoamer agents operative herein illustratively include silicone-based defoamers; mineral oil-based defoamers, and mixtures of foam destroying polymers and hydrophobic solids such as polyureas, as are known to the art. Specific exemplary silicone-based defoamers illustratively include silicone antifoam emulsion, silica-filled polydimethyl siloxane and polyether-modified polysiloxanes. A defoaming agent, if present, is included in amounts of from 0.1 to 5 total weight percent.

A fragrance, if present, is included in amounts of from 0.1 to 3 total weight percent.

A UV stabilizer imparts resistance against UV radiation. Examples of UV stabilizers are benzotriazoles, benzophenones, triazines, hindered amine light stabilizers, 2-(benzotriazol-2-yl)-4-(2,4,4trimethylpentan-2-yl) phenol, 3,5-di-t-butyl-4-hydroxybenzoic acid, hexadecyl ester and combinations thereof. The UV stabilizers, if present, is typically in an amount of from about 0.5 to 1.5 total weight percent.

A preservative is optionally present in an embodiment of the inventive composition. A preservative prevents microbial degradation and offers long term stability, and increases the overall stability of the composition. Preservatives operative herein illustratively include biphenyl-2-ol (ortho phenylphenol), 4,4-dimethyloxazolidine, 5-bromo-5-nitro-1,3-dioxane, 2-bromo-2-nitropropane-1,3-diol, 2,4-dichlorobenzyl alcohol, 5-chloro-2-(2,4-dichlorophenoxy)-phenol, 4-chloro-3,5-xylenol, 3,3'-bis-(1-hydroxymethyl-2,5-dioxoimidazolidinyl-4-yl)-1,1'-methylenedlurea (imidazolidinyl urea), poly(1-hexamethylene biguanidine hydrochloride), 2-phenoxyethanol, hexamethylenetetramine, benzyl alcohol, 1,3-bis-(hydroxymethyl)-5,5-dimethylimidazolidone-2,4-dione, 5-chloro-2-methylisothiazol-3(2H)-one, 2-methyl-isothiazol-3(2H)-one, benzisothiazolinone, 2-benzyl-4 chlorophenol, chlorhexidine and its digluconate, diacetate, and dihydrochloride salts, 1-phenoxy-propan-2-ol, cetyl pyridinium bromide and chloride, N-(hydroxymethyl-N-dihydroxymethyl-1,3-di-oxo-2,5-imidazolinidyl-4)-N'-hydroxymethyl urea, sodium hydroxymethylglycinate, benzethonium chloride, benzalkonium chloride, bromide and saccharinate, 3-iodopropynyl-butylcarbamate, benzisothiazolinone, triacetin, diazolidinyl urea, and cis-1-3-chloroallyl-3,5,7-triaza-1-azoniaadamantane chloride, and combinations thereof. Typically, a preservative is added in an amount of from about 0.05 to 1 total weight percent.

Inventive compositions include water in which in the graphene, silicone microemulsion, and reactive siloxane emulsion, along with any optional additives are soluble or suspended. In some inventive embodiments, the composition is limited to only include the aforementioned components of graphene, silicone microemulsion, and reactive siloxane emulsion, along with any optional additives and to the exclusion of other components not previously listed.

A process of application for an inventive composition to a surface includes the step applying the aqueous based composition. An inventive composition is readily applied to a substrate by swabbing, pump spray, or by application from a spray aerosol can. As such, a propellant is optionally added in a range from 5 to 95 total weight percent. Suitable propellants illustratively include alkanes such as butane, pentane, isobutane, propane; ethers such as dimethyl ether, diethyl ether, nitrogen; halogenated hydrocarbons; carbon dioxide and combinations thereof. The resultant formulation inclusive of a propellant is seated within a conventional metal aerosol canister and applied by spray application. Water is then allowed to evaporate from the composition to form a protective graphene film layer inclusive of the cross-linked siloxane and the silicone emulsion lipophilic components. The coating producing the shine and hydrophobicity is able to maintain durability subsequent to the application for several weeks under normal vehicle operating conditions. The protective film or fine/thin graphene film formed protects against mud, dust, dirty rain, water spots, and grime. The film forming process seals pores making the surface hydrophobic and having less surface roughness further contributing to the shine of the treated surface with such a coating formed from an inventive composition. In some embodiments, the graphene domain size and content is such that the resulting coating is transparent to an unaided, normal human eye. The film also forms a secondary bonding to the surface resulting in a sacrificial layer that is water and car wash resistant. These film layers repel dust and water and makes the surface easier to clean.

The formulary of an inventive composition is summarized below in Table 1.

TABLE 1

Inventive Cleaning and Surface Treatment Composition (exclusive of propellants).

| Component | Typical Amount Total Wt. Percent | Pref. Amount - Total Wt. Percent |
| --- | --- | --- |
| Graphene | 0.001-1 | 0.01-0.5 |
| Silicone microemulsion | 3-23 | 3-10 |
| Reactive siloxane O/W emulsion | 1-17 | 1-5 |
| Water | Remainder | Remainder |
| Optional components | | |
| pH modifier | to pH 5-11 | to pH 5-9 |
| Defoaming agent | 0.05-5 | 0.1-1 |
| Fragrance | 0.03-3 | 0.03-0.2 |
| UV stabilizer | 0.5-1.5 | 0.5-1.0 |
| Preservative | 0.05-1 | 0.1-0.5 |

Specific exemplary formulations of an inventive composition are provided, unless noted otherwise, all percentages for the specific formulation are total weight percentages. The advantages of this invention are more particularly shown by the following example in which the parts and percentages are by weight unless otherwise indicated.

Example 1

An inventive composition is formulated as follows:
Inventive composition 1 is detailed in Table 2.

TABLE 2

| Ingredient | Weight % |
| --- | --- |
| Water | 84.84% |
| Silicone microemulsion | 10.00% |
| Reactive siloxane O/W emulsion | 4.50% |
| UV stabilizer (Benzotriazole) | 0.50% |
| Graphene (1-5 um, 20% solids in water) | 0.10% |
| Preservative (Benzisothiazolinone) | 0.03% |
| Fragrance | 0.03% |
| Total | 100.00% |

Example 2

A panel of vulcanized rubber is sprayed with a composition of Example 1. The composition is allowed to dry at room temperature. The resulting film had a thickness of 1000 nanometers, as measured by ASTM D6988, and a hardness of 5 GPa, as measured by Vickers testing.

COMPARATIVE EXAMPLES

A like panel of Example 2 is sprayed with a composition of Example 1 with the proviso that the comparative composition lacks graphene dispersion with a commensurate increase in the amount of water present. The film has the same thickness and a hardness of 2.8 GPa.

Example 3

The process of Example 2 is repeated with the composition of Example 1 with the proviso that the graphene dispersion is replaced with a like amount of average 4 layer multi-layer graphene nanoplatelets having an average domain size of 5 microns. Similar results are obtained.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof are intended to define the scope of the invention.

The invention claimed is:

1. A vehicle surface coating composition comprising:
   graphene present from 0.001 to 1 total weight;
   a silicone microemulsion;
   a reactive siloxane oil-in-water emulsion comprising a reactive siloxane; and
   water as a majority by weight.

2. The composition of claim 1 wherein the composition further comprises: one or more of: pH modifier, a UV stabilizer, a defoaming agent, a fragrance, an anti-oxidant, or a combination thereof.

3. The composition of claim 1 further comprising a propellant to propel the composition from a spray aerosol can.

4. The composition of claim 1 wherein the graphene is 1 to 10 layers.

5. The composition of claim 1 wherein the graphene comprises graphene oxide.

6. The composition of claim 1 wherein the reactive siloxane oil-in-water emulsion is present from 1 to 17 total weight percent.

7. The composition of claim 6 wherein the reactive siloxane has the formula:

$$R^1{}_n SiO_{4-m/2}$$

where $R^1$ is $C_1$-$C_6$ alkyl, or $C_0$-$C_6$ alkyl hydroxyl groups and n has a value of from 0 to 3.

8. The composition of claim 6 wherein the reactive siloxane has the formula:

$$R^2-(SiO(R^2)_2)_n-(SiO(R^3)_a R^2{}_{2-a})_z-SiR^2{}_3$$

where $R^2$ is $C_1$-$C_{20}$ alkyl, $C_2$-$C_{18}$ alkyl, or $C_6$-$C_{20}$ alkyl, and $R^3$ is a siloxane side chain:

$$-O-(SiO(R^2)_2)_n SiR^2{}_3$$

where n is an integer with a value of from more than 0 to 100,000; a is an integer with a value of from 0 to 2, inclusive; and z is an integer with a value of from 0 to 100, inclusive.

9. A coating comprising:
   a silicone film formed by the evaporation of water from a silicone microemulsion and the cross-linking of a siloxane from an emulsion of claim 1; and
   graphene particles embedded in the silicone film, the coating having a thickness of between 5 and 10,000 nanometers and a hardness of between 3 and 7 GPa.

10. A process of imparting a durable shine to a vehicle surface comprising:
   applying to the vehicle surface a composition of claim 1; and
   allowing the water to evaporate to form a coating.

11. The process of claim 10 wherein the applying the composition is by pump spraying, swabbing, or pressurized aerosol.

12. Process of claim 11 further comprising wiping away an excess of the composition prior to the evaporating to form the coating.

13. Process of claim 10 wherein the vehicle surface is one or more of: a tire, exterior vehicle trim, interior vehicle trim, a dashboard, or door trim.

14. The process of claim 10 wherein the coating is transparent to an unaided, normal human eye.

\* \* \* \* \*